(12) United States Patent
Wang et al.

(10) Patent No.: US 9,810,829 B2
(45) Date of Patent: Nov. 7, 2017

(54) BACKLIGHT MODULE, HAVING A DEFORMABLE LAYER, DISPLAY MODULE AND DISPLAY DEVICE

(71) Applicant: BOE TECHNOLOGY GROUP CO., LTD., Beijing (CN)

(72) Inventors: Shang Wang, Beijing (CN); Chunjing Hu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 77 days.

(21) Appl. No.: 14/739,371

(22) Filed: Jun. 15, 2015

(65) Prior Publication Data

US 2016/0282540 A1   Sep. 29, 2016

(30) Foreign Application Priority Data

Mar. 26, 2015   (CN) .......................... 2015 1 0136704

(51) Int. Cl.
F21V 8/00   (2006.01)

(52) U.S. Cl.
CPC ......... *G02B 6/0051* (2013.01); *G02B 6/0068* (2013.01); *G02B 6/0078* (2013.01)

(58) Field of Classification Search
CPC .. G02B 6/0051; G02B 6/0075; G02B 6/0078; G02B 6/008
See application file for complete search history.

(56) References Cited

U.S. PATENT DOCUMENTS

| 2006/0262397 A1 | 11/2006 | Lee et al. |
| 2007/0146569 A1* | 6/2007 | Nouchi ............... G02B 6/0088 349/58 |
| 2009/0296026 A1* | 12/2009 | Bae ...................... G02B 6/008 349/65 |
| 2010/0182536 A1 | 7/2010 | Karakawa |
| 2010/0238367 A1 | 9/2010 | Montgomery et al. |
| 2014/0169000 A1* | 6/2014 | Hsu ................... B29C 45/14827 362/339 |

(Continued)

FOREIGN PATENT DOCUMENTS

| CN | 2421510 Y | 2/2001 |
| CN | 1500259 A | 5/2004 |
| CN | 2687711 Y | 3/2005 |

(Continued)

OTHER PUBLICATIONS

First Office Action regarding Chinese Application No. 201510136704.6 dated Jun. 30, 2016. Translation provided by Dragon Intellectual Property Law Firm.

*Primary Examiner* — Robert May
(74) *Attorney, Agent, or Firm* — Harness, Dickey & Pierce, P.L.C.

(57) ABSTRACT

The present disclosure provides a backlight module, a display module and a display device. The backlight module includes a plurality of backlight components in connection. Each backlight component includes: a light guide plate; a plurality of light emitting diodes (LEDs) provided on a light entering side of the light guide plate; a deformable layer provided on a light exiting side of the light guide plate. A thickness of the deformable layer is changeable under a pressure so as to deflect original light rays from at least a portion of LEDs of the plurality of LEDs.

19 Claims, 3 Drawing Sheets

(56) References Cited

U.S. PATENT DOCUMENTS

2015/0346499 A1* 12/2015 Minami ................ G02B 27/22
362/606

FOREIGN PATENT DOCUMENTS

| CN | 201081152 Y | | 7/2008 | | |
|----|----|----|----|----|----|
| CN | 101802493 A | | 8/2010 | | |
| CN | 203433141 U | | 2/2014 | | |
| CN | 104272017 A | | 1/2015 | | |
| KR | 20150137953 A | * | 12/2015 | ............ | G02B 27/22 |
| WO | 2009/079414 A1 | | 6/2009 | | |

* cited by examiner

BACKLIGHT MODULE, HAVING A DEFORMABLE LAYER, DISPLAY MODULE AND DISPLAY DEVICE

CROSS-REFERENCE TO RELATED APPLICATION

This application claims priority to Chinese Patent Application No. 201510136704.6 filed on Mar. 26, 2015, the disclosures of which are incorporated in their entirety by reference herein.

TECHNICAL FIELD

The present disclosure relates to the liquid crystal display field, in particular to a backlight module, a display module and a display device.

BACKGROUND

A flexible display device is made of a flexible material. The display device is deformable, flexible, and as thin as a paper. Even if the power supply is cut off, the content displayed on the display device will not disappear. Therefore, the display device is also known as "electronic paper". At present, more and more attention has been paid to the flexible display technology and researchers are working on how to increase a curvature of the flexible display device or extend a service life of the flexible display device. Flexible display products have also been developed by some flat panel manufacturers to attract consumers' attention.

A backlight module is one of the key components of a liquid crystal display device, and configured to provide a light source for the liquid crystal display liquid panel so that the display panel can display images. Therefore, a quality of the light source provided by the backlight module largely determines a display effect of the liquid crystal display device.

However, most of existing flexible displays use a bending type backlight module or a flat-panel type backlight module. Taking a bending type backlight module as an example, as shown in FIG. 1, a plurality of light emitting diodes (LEDs) 2 is provided on an light entering side of a light guide plate 1, and configured to provide a light source for a flexible display screen 3. An air interlayer 4 is provided between the light guide plates 1 and the flexible display screen 3. A plurality of the light guide plates 1 is connected by elastic glue 5. It can be seen that, for the above backlight module, light rays in a first region 6 are too concentrated, so that uniform illumination of the backlight module cannot be achieved.

SUMMARY

An object of the present disclosure is to provide a backlight module, a display module and a display device, so as to realize uniform illumination of a bended backlight module.

In order to achieve the above object, an embodiment of the present disclosure provides a backlight module, including a plurality of backlight components in connection; wherein each backlight component includes:
a light guide plate;
a plurality of light emitting diodes (LEDs), provided on a light entering side of the light guide plate;
a deformable layer, provided on a light exiting side of the light guide plate, a thickness of the deformable layer being changeable under a pressure so as to deflect original light rays from at least a portion of LEDs of the plurality of LEDs.

Alternatively, the deformable layer includes:
a light deflection layer disposed on the light guide plate and a shell layer covering the light deflection layer;
wherein, the shell layer is deformable under an external pressure; a thickness of the light deflection layer is changed along with deformation of the shell layer, so as to deflect original light rays from at least a portion of LEDs of the plurality of LEDs.

Alternatively, the shell layer is made of a transparent material; the light deflection layer is made of a transparent colorless liquid colloidal material.

Alternatively, the liquid colloidal material is a silicone gel or an optical gel; the shell layer is an organic substrate, a plastic substrate or a resin substrate.

Alternatively, light rays are emitted from the plurality of LEDs along a predetermined direction; the predetermined direction is a direction substantially perpendicular to a light exiting surface of the light guide plate.

Alternatively, light rays emitted from the plurality of LEDs are parallel.

In order to achieve the above object, an embodiment of the present disclosure further provides a display module, wherein the display module includes a flexible display screen and the above backlight module, and an air interlayer is provided between the flexible display screen and the backlight module.

In order to achieve the above object, an embodiment of the present disclosure further provides a display device, including the above display module.

In embodiments of the present disclosure, a deformable layer is added on a light exiting side of the light guide plate of each backlight component. A thickness of the deformable layer can be changed under a pressure so as to deflect original light rays from at least a portion of LEDs of the plurality of LEDs. As a result, uniform illumination of a bended backlight module can be achieved.

DETAILED DESCRIPTION

In order to make the objects, the technical solutions and the advantages of the present disclosure more apparent, detailed descriptions will be given in conjunction with the drawings and embodiments.

Figure 1:
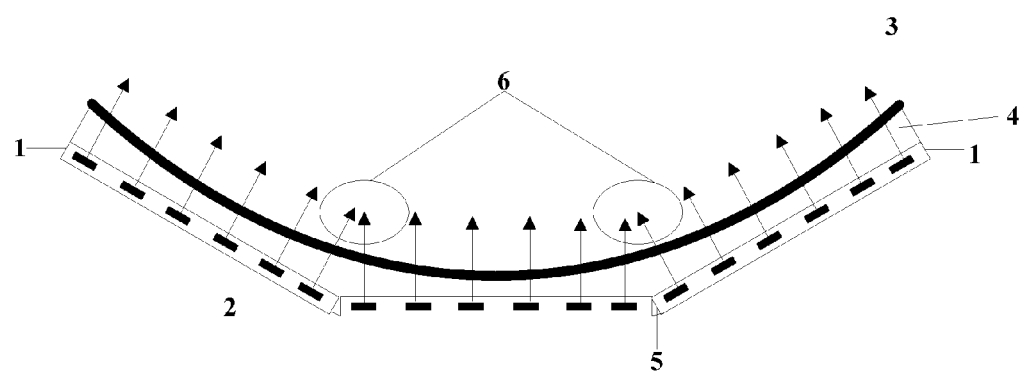
FIG. 1 is a schematic diagram showing a structure of an existing display module with a bending type backlight module.
Figure 2:
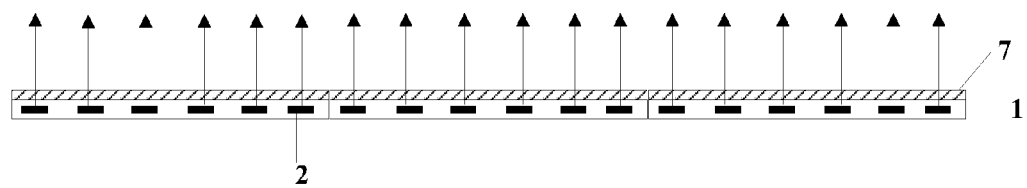
FIG. 2 is a schematic diagram showing a structure of a backlight module when it is horizontally arranged according to an embodiment of the present disclosure.

As shown in FIG. 2, an embodiment of the present disclosure provides a backlight module, including a plurality of backlight components in connection. The plurality of backlight modules may be connected by elastic glue 5(not shown in FIG. 2).

Each backlight component includes:
- a light guide plate 1;
- a plurality of light emitting diodes (LEDs) 2 provided on a light entering side of the light guide plate 1;
- a deformable layer 7 provided on an light exiting side of the light guide plate 1, a thickness of the deformable layer 7 being changeable under a pressure so as to deflect original light rays from at least a portion of LEDs of the plurality of LEDs 2.

In an embodiment of the present disclosure, a backlight module is provided. The backlight module includes a plurality of backlight components connected by for example, elastic glue 5. A deformable layer 7 is added on a light exiting side of the light guide plate 1 of each backlight component. A thickness of the deformable layer 7 can be changed under a pressure so as to deflect original light rays from at least a portion of LEDs of the plurality of LEDs 2. As a result, uniform illumination of a bended backlight module can be achieved.

Figure 3:
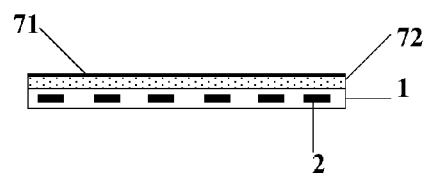
FIG. 3 is a schematic diagram showing a structure of a deformable layer provided on a light exiting side of a light guide plate according to an embodiment of the present disclosure.

In the above backlight module, alternatively, the deformable layer is as shown in FIG. 3, which includes:
- a light deflection layer 72 disposed on the light guide plate 1 and a shell layer 71 covering the light deflection layer 72;
- wherein the shell layer 71 is deformable under an external pressure; a thickness of the light deflection layer 72 is changed along with deformation of the shell layer 71, so as to deflect original light rays from at least a portion of LEDs of the plurality of LEDs 2.

The shell layer 71 is made of a transparent material. Alternatively, the shell layer may be made of an organic substrate, a plastic substrate or a resin substrate. the light deflection layer 72 is made of a transparent colorless liquid colloidal material. Alternatively, the liquid colloidal material is a silicone gel or an optical gel. The deformable layer 7 can deflect light rays from at least a portion of LEDs, but will not block the light rays to be emitted. Any means that can achieve the above objects shall fall within the protection scope of the present disclosure.

Specifically, uniform illumination of a bended backlight module can be achieved by deflecting original light rays from at least a portion of LEDs in the plurality of LEDs 2 by the deformable layer 7. The present disclosure further provide two preferred embodiments as follows.

<First Embodiment>

Figure 4:
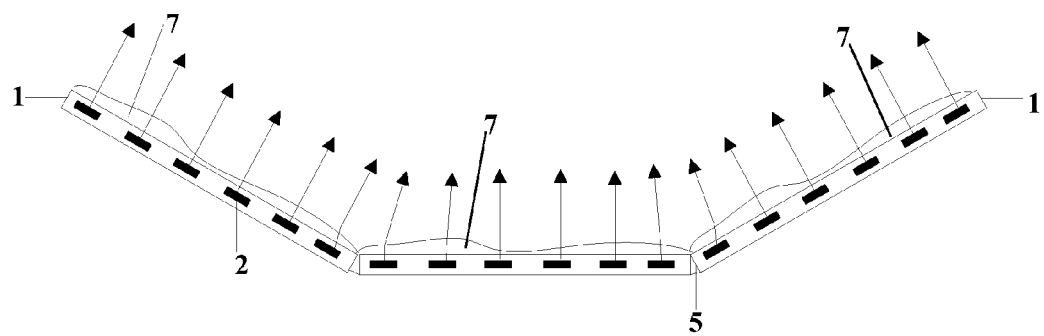
FIG. 4 is a schematic diagram showing a structure of a backlight module when it is bended according to an embodiment of the present disclosure.

As shown in FIG. 4, after passing through the deformable layer 7, light rays from the plurality of LED 2 are propagated along directions substantially perpendicular to a light exiting surface of the light guide plate 1. As a result, uniform illumination of the bended backlight module can be achieved.

<Second Embodiment>

Figure 5:
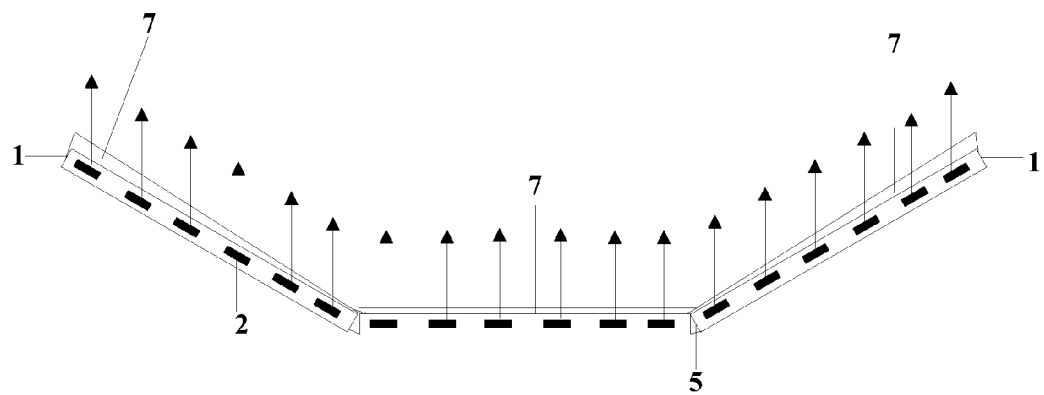
FIG. 5 is a schematic diagram showing a structure of a backlight module when it is bended according to another embodiment of the present disclosure.

As shown in FIG. 5, after passing through the deformable layer 7, light rays emitted by the plurality of LED 2 are parallel, thereby achieving uniform illumination of the bended backlight module.

Figure 6:
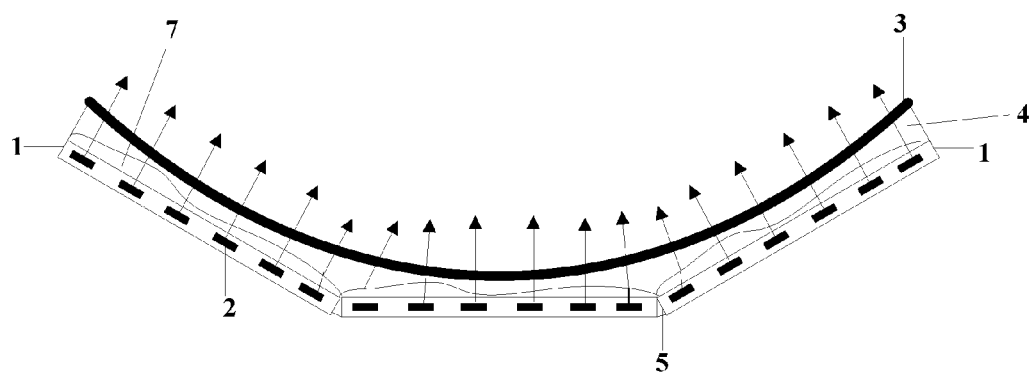
FIG. 6 is a schematic diagram showing a structure of a display module according to an embodiment of the present disclosure.
Figure 7:
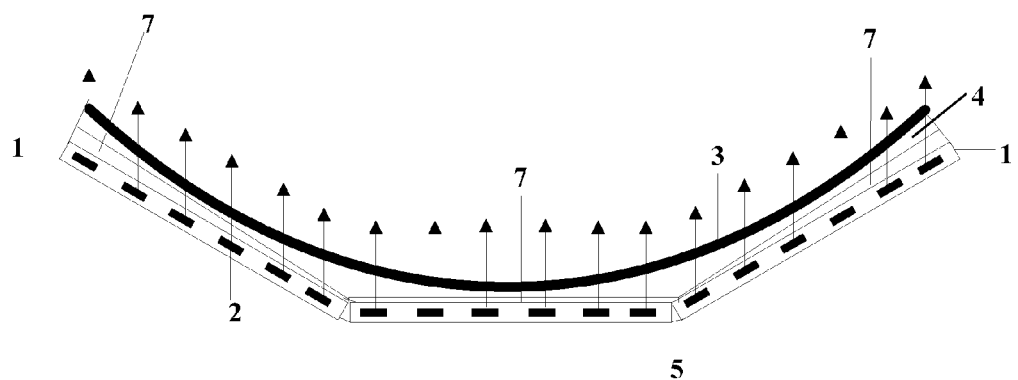
FIG. 7 is a schematic diagram showing a structure of a display module according to another embodiment of the present disclosure.

An embodiment of the present disclosure further provides a display module, wherein the display module includes a flexible display screen and the above backlight module. An air interlayer 4 is provided between the flexible display screen 3 and the backlight module, optionally in a manner as shown in FIG. 6 or 7.

When the flexible screen 3 is deformed, the air interlayer 4 will apply a pressure to the shell layer 71 of the deformable layer 7 of the backlight component and at the same time, because of the stress of the shell layer 71 itself, the shell layer 71 will apply a pressure to the light deflection layer 72, which makes the light deflection layer 72 change its thickness, so that the light rays are deflected and the uniform illumination is achieved.

An embodiment of the present disclosure further provides a display device, including the above display module.

The above is only preferred embodiments of the present disclosure, it should be noted that several improvements and modifications may be made for a person skilled in the art without departing from the principle of the present disclosure, and also should be considered to fall within the protection scope of the present disclosure.

What is claimed is:

1. A backlight module, comprising a plurality of backlight components,
   wherein each of the plurality of backlight components comprises one of a plurality of light guide plates, the plurality of light guide plates being connected by an elastic glue, and the plurality of light guide plates not being arranged in a same plane,
   wherein each backlight component further comprises:
      a plurality of light emitting diodes (LEDs) provided on a light entering side of the light guide plates;
      a deformable layer provided on a light exiting side of the light guide plate, a thickness of the deformable layer being changeable under a pressure so as to deflect original light rays from at least a portion of LEDs of the plurality of LEDs.

2. The backlight module according to claim 1, wherein the deformable layer comprises:
   a light deflection layer disposed on the light guide plate and a shell layer covering the light deflection layer;
   wherein the shell layer is deformable under the pressure, a thickness of the light deflection layer is changed along with deformation of the shell layer, so as to deflect original light rays from at least a portion of LEDs of the plurality of LEDs.

3. The backlight module according to claim 2, wherein the shell layer is made of a transparent material; the light deflection layer is made of a transparent colorless liquid colloidal material.

4. The backlight module according to claim 3, wherein light rays are emitted from the plurality of LEDs along a predetermined direction; the predetermined direction is a direction substantially perpendicular to a light exiting surface of the light guide plate.

5. The backlight module according to claim 3, light rays emitted from the plurality of LEDs are parallel.

6. The backlight module according to claim 3, wherein the liquid colloidal material is a silicone gel or an optical gel; the shell layer is an organic substrate, a plastic substrate or a resin substrate.

7. The backlight module according to claim 6, wherein light rays are emitted from the plurality of LEDs along a predetermined direction; the predetermined direction is a direction substantially perpendicular to a light exiting surface of the light guide plate.

8. The backlight module according to claim 6, light rays emitted from the plurality of LEDs are parallel.

9. The backlight module according to claim 2, wherein light rays are emitted from the plurality of LEDs along a predetermined direction; the predetermined direction is a direction substantially perpendicular to a light exiting surface of the light guide plate.

10. The backlight module according to claim 2, light rays emitted from the plurality of LEDs are parallel.

11. The backlight module according to claim 1, wherein light rays are emitted from the plurality of LEDs along a predetermined direction; the predetermined direction is a direction substantially perpendicular to a light exiting surface of the light guide plate.

12. The backlight module according to claim 1, light rays emitted from the plurality of LEDs are parallel.

13. A display module, comprising a flexible display screen and a backlight module,
wherein an air interlayer is provided between the flexible display screen and the backlight module;
the backlight module comprises a plurality of backlight components, each of the plurality of backlight components comprises one of a plurality of light guide plates, the plurality of light guide plates being connected by an elastic glue, and each of the plurality of light guide plates not being arranged in a same plane;
wherein each backlight component further comprises:
a plurality of light emitting diodes (LEDs) provided on a light entering side of the light guide plate;
a deformable layer provided on a light exiting side of the light guide plate, a thickness of the deformable layer being changeable under a pressure so as to deflect original light rays from at least a portion of LEDs of the plurality of LEDs.

14. The display module according to claim 13, wherein the deformable layer comprises:
a light deflection layer disposed on the light guide plate and a shell layer covering the light deflection layer;
wherein the shell layer is deformable under the pressure; a thickness of the light deflection layer is changed along with deformation of the shell layer, so as to deflect original light rays from at least a portion of LEDs of the plurality of LEDs.

15. The display module according to claim 14, wherein the shell layer is made of a transparent material; the light deflection layer is made of a transparent colorless liquid colloidal material.

16. The display module according to claim 15, wherein the liquid colloidal material is a silicone gel or an optical gel; the shell layer is an organic substrate, a plastic substrate or a resin substrate.

17. The display module according to claim 13, wherein light rays are emitted from the plurality of LEDs along a predetermined direction; the predetermined direction is a direction substantially perpendicular to a light exiting surface of the light guide plate.

18. The display module according to claim 13, light rays emitted from the plurality of LEDs are parallel.

19. A display device, comprising the display module according to claim 13.

* * * * *